United States Patent [19]

Shirayanagi et al.

[11] Patent Number: 4,637,720

[45] Date of Patent: Jan. 20, 1987

[54] LENS METER HAVING A FOCUSING INDICATION SYSTEM WITH DIVIDED-IMAGE REGISTRATION FOCUSING

[75] Inventors: Moriyasu Shirayanagi; Osamu Shindo; Hirochika Aiura; Tadao Hara, all of Tokyo, Japan

[73] Assignee: Ashahi Kogaku Kogyo Kabushiki Kaisha, Tokyo, Japan

[21] Appl. No.: 550,689

[22] Filed: Nov. 10, 1983

[30] Foreign Application Priority Data

Nov. 11, 1982 [JP] Japan .................................. 57-198292

[51] Int. Cl.$^4$ ................................................ G01B 9/00
[52] U.S. Cl. ...................................... 356/125; 356/124
[58] Field of Search ................................ 356/124, 125

[56] References Cited

U.S. PATENT DOCUMENTS

| 4,275,964 | 6/1981 | Vassiliadis | 356/125 |
| 4,293,199 | 10/1981 | Wada et al. | 351/211 |
| 4,400,070 | 8/1983 | Isono et al. | 351/208 |
| 4,526,427 | 7/1985 | Fantone | 356/125 |

FOREIGN PATENT DOCUMENTS 2849407  5/1979  Fed. Rep. of Germany ...... 356/124

Primary Examiner—R. A. Rosenberger
Assistant Examiner—Crystal D. Cooper
Attorney, Agent, or Firm—Sughrue, Mion, Zinn, Macpeak & Seas

[57] ABSTRACT

A lens meter having a focusing indication system with divided-image registration focusing comprises a condenser lens, a target having a nondiffusing transmissive surface and a slit pattern thereon, an objective lens, a lens mount for supporting a lens to be examined, a projection lens, a screen, the arrangement being such that the distance of movement in unison of the condenser lens and the target in the direction of an optical axis is read to detect the degree of the lens supported on the lens mount, an aperture plate disposed in the vicinity of a front focal point of the condenser lens and movable with the condenser lens and the target in the direction of the optical axis, and at least two deflection prisms disposed in intimate contact with the slit pattern on the target and having bases extending across the slit pattern and substantially perpendicularly to each other.

8 Claims, 8 Drawing Figures

LENS METER HAVING A FOCUSING INDICATION SYSTEM WITH DIVIDED-IMAGE REGISTRATION FOCUSING

BACKGROUND OF THE INVENTION

The present invention relates to a lens meter having a focusing indication system with divided-image registration focusing as an auxiliary means for focusing determination.

There have heretofore been available two methods for visual judgement of focusing in lens meters. One of the methods utilizes the sharpness of an image as information for focusing determination and has found wide use in many lens meters. The advantage of this method is that since a lens being examined is measured substantially through the entire area of a lens mount opening, it is relatively easy to find various faults such as polishing defects and striae of the lens. However, the method is disadvantageous in that as the power of a single lens (usually a spectable lens) increases, aberrations are increased to the point where focusing determination is extremely difficult to make, and thus it is time-consuming to effect focusing and any focused condition cannot be reproduced easily.

The other method relies on separate-image registration focusing as disclosed in Japanese Patent Publications Nos. 42-12107 and 42-14269. This method relies on the fact that the vernier acuity of human vision is extremely good, and allows focusing to be effected in a short period of time with improved focusing reproducibility. However, the method as disclosed in the foregoing publications suffers from many shortcomings. A first difficulty is that any polishing faults and striae of a lens being examined are difficult to find, as a narrow beam of light is employed for examination. A second problem is that a bright light source is required to compensate for any brightness shortage due to the narrow light beam used. A third difficulty is diffraction causing unsharp images, though the depth of focus is large due to the narrow light beam. A fourth shortcoming is that both of the apparatus disclosed in the above publications are unfamiliar to those who have been accustomed to the measurement process by the conventional lens meters. A fifth defect is that the disclosed apparatus have complex optical systems which involve many difficulties in the manufacture and adjustment of the apparatus.

SUMMARY OF THE INVENTION

It is an object of the present invention to provide a lens meter which will eliminate the first to fifth problems, as set forth above, and has the advantages offered by the first and second conventional methods as described above.

According to the present invention, there is provided a lens meter having a focusing indication system with divided-image registration focusing, and comprising a condenser lens, a target having a nondiffusing transmissive surface and a slit pattern thereon, an objective lens, a lens mount for supporting a lens to be examined, a projection lens, a screen, the arrangement being such that the distance of movement in unison of the condenser lens and the target in the direction of an optical axis is read to detect the vertex power of the lens supported on the lens mount, an aperture plate disposed in the vicinity of a front focal point of the condenser lens and movable with the condenser lens and the target in the direction of the optical axis, and at least two deflection prisms disposed in intimate contact with the slit pattern on the target and having first surfaces extending across the slit pattern and substantially perpendicularly to each other.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE INVENTION

Figure 1:
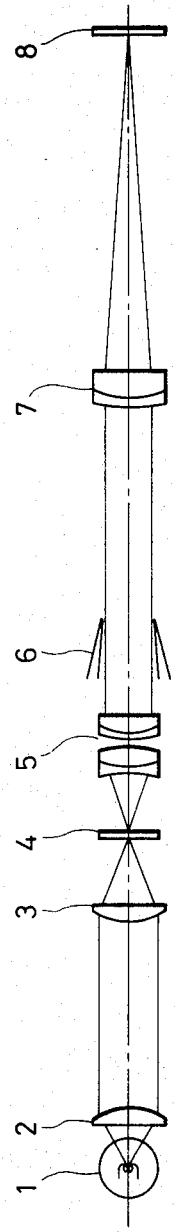
FIG. 1 is a diagram showing a conventional lens meter relying on focusing determination based on image sharpness.

FIG. 1 is illustrative of a prior lens meter which relies on image sharpness for focusing judgement. Operation of the lens meter of FIG. 1 will hereinafter be described.

Rays of light emitted from a light source 1 are turned into substantially parallel rays of light by a collimator lens 2. The parallel rays of light are converged on a target 4 by a condenser lens 3. The rays of light which have passed through a slit pattern on the target 4 are turned into parallel rays of light by an objective lens 5, and the image of the slit pattern on the target 4 is focused on a screen 8 by a projection lens 7. The foregoing image focusing system includes no lens to be examined. When a lens to be examined is placed on a lens mount 6, the condenser lens 3 and the target 4 are moved in unison along the optical axis so that the blurred image of the slit pattern on the screen 8 will be sharply focused. When the image becomes sharp, the condenser lens 3 and the target 4 are stopped, and the distance that they have moved is read to determine the vertex power of the lens being examined.

Various modifications of the lens meter of FIG. 1 have been known in the art. For example, one known lens meter has no collimator lens 2 and no condenser lens 3 with the target 4 having a diffusion surface facing toward the light source 1. Another lens meter does not include the condenser lens 3.

According to the present invention, a lens meter is composed of a target 4, an objective lens 5, a lens mount 6, a projection lens 7, and a screen 8, which are minimum components required to enable the lens meter to function properly. The lens meter of the present invention additionally has a condenser lens 3 with the target 4 having no diffusing surface facing toward the light source. The object of the present invention can be achieved by modifying the prior art lens meter (such as shown in FIG. 1) in order to meet the above requirements.

The present invention will now be described as to its construction and operating with reference to the drawings.

Figure 2:
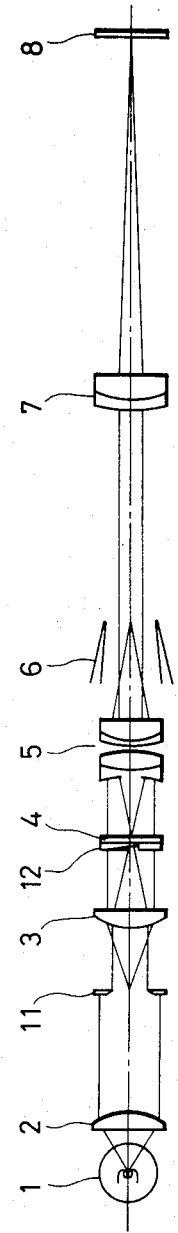
FIG. 2 is a diagram of a lens meter according to the present invention.

FIG. 2 shows a lens meter according to the present invention. Identical or corresponding parts in FIG. 2 are denoted by identical or corresponding reference characters in FIG. 1, and will not be described.

The lens meter of the present invention differs from the conventional lens meter in that an aperture plate 11 having an aperture of suitable size is placed in the vicinity of a front focal point of the condenser lens 3, the surface of the target 4 on which the slit pattern is placed is directed toward the light source 1, and deflection prisms 12 are disposed in intimate contact with the slit pattern on the target 4 with the prisms 12 extending in crossing relation to the slit pattern and substantially perpendicularly to adjacent prisms.

Figure 3A:
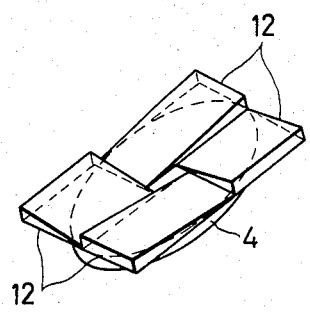
FIG. 3(a) is a perspective view of deflection prisms held in intimate contact with a target.
Figure 3B:
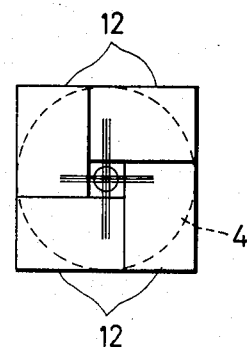
FIG. 3(b) is a front elevational view of the deflection prisms shown in FIG. 3(a)
Figure 3C:
FIG. 3(c) is a side elevational view of the deflection prisms shown in FIG. 3(a)

Several structural features of importance according to the present invention will be described. The first feature is that at least two deflection prisms are arranged to extend in crossing relation to the slit patten and substantially perpendicularly to each other. With this arrangement, any blurring of the separation line due to the prism side walls as referred to in the Publication No. 42-12107 can be reduced. The blurring of a separation line is caused by high side walls of prisms. The prism side walls can be lowered in height by the arrangement shown in FIGS. 3(a) through 3(c). This prism construction is also advantageous in that the prism side walls can be positioned closely to the center of the slit pattern which is of vital importance in measuring the vertex power of a lens. Aberrations of the objective lens 5 and the projection lens 7 cause the best image plane for light rays emitted from the center of the target 4 to be at a different position along the optical axis from the best image plane for light rays emitted from the periphery of the target 4. This results in a readout accuracy which is affected by where the vertex power of the lens is read in the slit pattern. It is customary practice to read the vertex power of lens at the center of the slit pattern. Accordingly, it is of prime importance to place the prism side walls in the vicinity of the center of the slit pattern. Another advantage is that the deflection prisms 12 can be easily fabricated. The slit pattern is normally quite small in size, and any attempt to reduce the size of deflection prisms in conformity with the small slit pattern would result in a high cost of fabrication. However, the arrangement of the invention permits the deflection prisms to be large in size and to be easily constructed.

The second structural feature is that the vertex angle of the deflection prisms 12 and the size of the aperture in the aperture plate 11 can be determined by the brightness of the slit pattern image, diffraction limit, the difference between the luminance of an area of the slit pattern that has passed through the deflection prisms 12 and that of an area of the slit pattern image that has not passed through the deflection prisms 12, and the registration sensitivity of divided images.

Since the lens mount 6 has an opening positioned in the rear focal point of the objective lens 5, the image of the aperture in the aperture plate 11 is focused by the condenser lens 3 and the objective lens 5 in the same position as that of the opening in the lens mount 6. Parameters for determining the vertex angle of the deflection prism 12 and the size of the aperture in the aperture plate 11 are defined below.

(1) Registration Sensitivity K of Divided Images

The position of the center of gravity of a common area shared by the image of the aperture in the aperture plate 11, displaced by the deflection prisms, and the opening in the lens mount is measured from the center of the lens mount as a displacement $r_M$, and the opening in the lens mount has a radius $r_6$. The ratio between the displacement and the radius is defined as follows:

$$K = r_M / r_6$$

(2) Ratio $B_C$ Between Luminances of the Centers of Slit Pattern Images

The image of the aperture in the aperture plate 11 not displaced by the deflection prisms has an area $S_{11}$ and the opening in the lens mount has an area $S_6$. The ratio between these areas is defined as follows:

$$B_C = S_{11}/S_6$$

(3) Ratio $B_D$ Between Luminances of the Peripheries of Slit Pattern Images

The common area shared by the image of the aperture in the aperture plate 11 displaced by the deflection prisms and the opening in the lens mount has an area $S_{11'}$, and the ratio between the area $S_{11'}$ and the area $S_{11}$ of the image of the aperture in the aperture plate 11 not displaced by deflection prisms is defined as follows:

$$B_D = S_{11'}/S_{11}$$

The area of the image of the aperture in the aperture plate 11 not displaced by the deflection prisms does not exceed the area of the opening in the lens mount.

Various designs are feasible dependent on which parameter K, $B_C$ or $B_D$ is to be emphasized. It has been confirmed that each parameter is subjected to boundary conditions. For example, if the parameter K were 0.33 or less, then it would be an insufficient registration sensitivity of divided images. If the parameter $B_C$ in a projection-type lens meter were 0.1 or less, then the lens meter would be strongly affected by diffraction. If the parameter $B_D$ were 0.7 or smaller, the luminance of the edge of the slit pattern image would be appreciably lowered, resulting in problems in visibility and measurement accuracy.

To meet the foregoing boundary conditions, the registration sensitivity K is required to satisfy the inequality:

$$0.33 \leq K \leq 0.67 \tag{1}$$

For, if K>0.67, then the possibility of failing to meet the conditions $B_C \geq 0.1$, or $B_D \geq 0.7$ would be increased.

The range that the vertex angle α of the deflection prisms satisfying the inequality (1) can fall in is required to meet the following inequality:

$$\tan^{-1}(0.33 r_6)/f_5 \leq (n-1)\alpha \leq \tan^{-1}(0.67 r_6)/f_5 \tag{2}$$

where $f_5$ is the focal length of the objective lens 5, $r_6$ the radius of the opening in the lens mount 6, and n the refractive index of the deflection prisms. It is necessary that the size of the aperture in the aperture plate 11 be determined not to exceed the foregoing parameter boundary conditions with respect to the vertex angle α of the deflection prisms which meets the inequality (2).

Figure 4A:
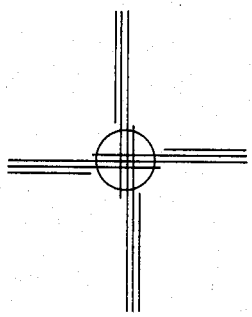
FIGS. 4(a) through 4(c) are views showing various slit patterns on a screen of the lens meter of the present invention.
Figure 4B:
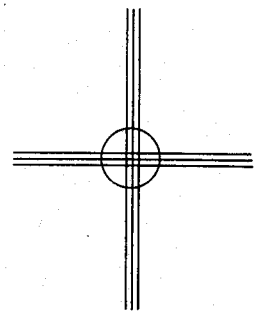
Figure 4C:
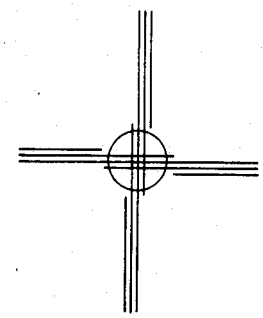

The lens meter having the above first and second features gives visual indications similar to those of the ordinary lens meters at the time of focusing as shown in FIG. 4(b). At times before and after the image is focused, as shown in FIGS. 4(a) and 4(c), the crisscross lines of the slit pattern are blurred and simultaneously separated along the boundary lines of the side walls of the deflection prisms.

The lens meter of the present invention may be modified such that the aperture plate 11 may not be exactly positioned on the front focal point of the condenser lens 3, but may be positioned substantially on the front focal point of the condenser lens 3 with substantially no functional problems. Since it is only necessary to know the vertex powers of two orthogonal main meridians from the standpoint of achieving the object of the present invention, two deflection prisms 12 are sufficient. Thus, the object of the present invention can be accomplished by a lens meter having two deflection prisms extending substantially perpendicularly to each other and across the crisscross lines of a slit pattern.

The lens meter with the first and second features as described above is advantageous in that: since a relatively thick beam of light is employed, (1) focusing can easily be judged and is highly reproducible;

(2) it is easy to find local grinding defects and striae of a lens being examined;

(3) the luminance of a slit pattern image is not lowered to the extent which requires the light source to be brighter;

(4) images are not deteriorated due to diffraction; and (5) the user can handle the lens meter quite easily as the measuring procedure thereof remains substantially the same as that of the conventional lens meter.

The structure of the lens meter of the invention which is different from the prior lens meters with image registration focusing can be fabricated more easily since the number of parts required is small, it is less expensive, and can be formed and adjusted with utmost ease.

Although a certain preferred embodiment has been shown and described, it should be understood that many changes and modifications may be made therein without departing from the scope of the appended claims.

We claim:

1. A lens meter having a focusing indication system with a divided-image registration focusing, comprising:

a target having a non-diffusing transmissive surface and a slit pattern thereon;

a condenser lens for converging a source light toward said target, said condenser lens having a front focal point on a side of said condenser lens opposite said target;

an objective lens for receiving light passing through said slit pattern;

a lens mount for supporting a lens to be examined;

a projection lens downstream of said lens mount for receiving light from said objective lens after passing through said lens to be examined;

a screen for receiving light passing through said projection lens, the arrangement being such that the distance of movement in unison of said condenser lens and said target in the direction of an optical axis is read to detect the vertex power of the lens supported on said lens mount;

an aperture plate disposed in the vicinity of said front focal point of said condenser lens and movable with said condenser lens and said target in the direction of said optical axis; and at least two deflection prisms disposed with first surfaces in intimate contact with said slit pattern on said target, said first surfaces extending across said slit pattern and being substantially perpendicular to one another;

wherein said aperture plate has an aperture size and each of said deflection prisms has a vertex angle, said aperture size and said vertex angle being determined such that registration sensitivity K, the registration sensitivity of images, ratio $B_C$, the ratio between luminances of the centers of the images, the ratio $B_D$, the ratio between luminances of the peripheries of the images, will meet the following relations:

$K \geq 0.33$ $B_C \geq 0.1$ $B_D \geq 0.7$.

2. A lens meter according claim 1, wherein said slit pattern on said target comprises criss-cross lines, and wherein said lens meter includes four prisms having first surfaces collectively defining a substantially square-shaped area with an opening at the center of said square-shaped area being in perpendicular relation to said criss-cross lines.

3. A lens meter according to claim 1, wherein said each of said deflection prisms has a vertex angle $\alpha$ determined to meet the following relation:

$$\tan^{-1} (0.33 r_6)/f_5 \leq (n-1)\alpha \leq \tan^{-1} (0.67 r_6)/f_5$$

where $f_5$ is the focal length of the objective lens, $r_6$ the radius of an opening in the lens mount, and n the refractive index of the deflection prism.

4. A lens meter having a focusing indication system with a divided-image registration focusing, comprising:

a target having a non-diffusing transmissive surface and a slit pattern thereon, said slit pattern on said target comprising criss-cross lines;

a condenser lens for converging a source light toward said target, said condenser lens having a front focal point on a side of said condenser lens opposite said target;

an objective lens for receiving light passing through said slit pattern;

a lens mount for supporting a lens to be examined;

a projection lens downstream of said lens mount for receiving light from said objective lens after passing through said lens to be examined;

a screen for receiving light passing through said projection lens, the arrangement being such that the distance of movement in unison of said condenser lens and said target in the direction of an optical axis is read to detect the vertex power of the lens supported on said lens mount;

an aperture plate disposed in the vicinity of said front focal point of said condenser lens and movable with said condenser lens and said target in the direction of said optical axis; and four deflection prisms disposed with first surfaces in intimate contact with said slit pattern on said target, said first surfaces extending across said slit pattern and collectively defining a substantially square-shaped area with an opening at the center of said square-shaped area being in perpendicular relation to said criss-cross lines.

5. A lens meter having a focusing indication system with a divided-image registration focusing, comprising:
- a target having a non-diffusing transmissive surface and a slit pattern thereon;
- a condenser lens for converging a source light toward said target, said condenser lens having a front focal point on a side of said condenser lens opposite said target;
- an objective lens for receiving light passing through said slit pattern;
- a lens mount for supporting a lens to be examined;
- a projection lens downstream of said lens mount for receiving light from said objective lens after passing through said lens to be examined;
- a screen for receiving light passing through said projection lens, the arrangement being such that the distance of movement in unison of said condenser lens and said target in the direction of an optical axis is read to detect the vertex power of the lens supported on said lens mount;
- an aperture plate disposed in the vicinity of said front focal point of said condenser lens and movable with said condenser lens and said target in the direction of said optical axis; and
- at least two deflection prisms disposed with first surfaces in intimate contact with said slit pattern on said target, said first surfaces extending across slit pattern and being substantially perpendicular to one another, wherein each of said deflection prisms has a vertex angle α determined to meet the following relation:

$$\tan^{-1}(0.33r_6)/f_5 \leq (n-1)\alpha \leq \tan^{-1}(0.67r_6)/f_5$$

wherein $f_5$ is the focal length of the objective lens, $r_6$ the radius of an opening in the lens mount, and n the refractive index of the deflection prism.

6. A lens meter having a focusing indication system with a divided-image registration focusing, comprising:
- a target having a non-diffusing transmissive surface and a slit pattern thereon, said slit pattern comprising a first plurality of slits extending in a first direction and being adjacent and parallel to one another, and a second plurality of slits extending in a second direction orthogonal to said first direction and being adjacent and parallel to one another;
- a condenser lens for converging a source light toward said target, said condenser lens having a front focal point on a side of said condenser lens opposite said target;
- an objective lens for receiving light passing through said slit pattern;
- a lens mount for supporting a lens to be examined;
- a projection lens downstream of said lens mount for receiving light from said objective lens after passing through said lens to be examined;
- a screen for receiving light passing through said projection lens, the arrangement being such that the distance of movement in unison of said condenser lens and said target in the direction of an optical axis is read to detect the vertex power of the lens supported on said lens mount;
- an aperture plate disposed in the vicinity of said front focal point of said condenser lens and movable with said condenser lens and said target in the direction of said optical axis; and
- at least two deflection prisms disposed with first surfaces in intimate contact with said slit pattern on said target, said first surfaces extending across said slit pattern and being substantially perpendicular to one another.

7. A lens meter having a focusing indication system with a divided-image registration focusing, comprising:
- a target having a non-diffusing transmissive surface and a slit pattern thereon;
- a condenser lens for converging a source light toward said target, said condenser lens having a front focal point on a side of said condenser lens opposite said target;
- an objective lens for receiving light passing through said slit pattern;
- a lens mount for supporting a lens to be examined;
- a projection lens downstream of said lens mount for receiving light from said objective lens after passing through said lens to be examined;
- a screen for receiving light passing through said projection lens, the arrangement being such that the distance of movement in unison of said condenser lens and said target in the direction of an optical axis is read to detect the vertex power of the lens supported on said lens mount;
- an aperture plate disposed in the vicinity of said front focal point of said condenser lens and movable with said condenser lens and said target in the direction of said optical axis; and
- at least two deflection prisms disposed on the same side of said target as said condenser lens with first surfaces in intimate contact with said slit pattern on said target, said first surfaces extending across said slit pattern and being substantially perpendicular to one another.

8. A lens meter having a focusing indication system with a divided-image registration focusing, comprising:
- a target having a non-diffusing transmissive surface and a slit pattern thereon;
- a condenser lens for converging a source light toward said target, said condenser lens having a front focal point on a side of said condenser lens opposite said target;
- an objective lens for receiving light passing through said slit pattern;
- a lens mount for supporting a lens to be examined;
- a projection lens downstream of said lens mount for receiving light from said objective lens after passing through said lens to be examined;
- a screen for receiving light passing through said projection lens, the arrangement being such that the distance of movement in unison of said condenser lens and said target in the direction of an optical axis is read to detect the vertex power of the lens supported on said lens mount;
- an aperture plate disposed in the vicinity of said front focal point of said condenser lens and movable with said condenser lens and said target in the direction of said optical axis; and
- first, second, third and fourth deflection prisms disposed with first surfaces in intimate contact with said slit pattern on said target, said first surfaces extending across said slit pattern and being substantially perpendicular to one another, each of said prisms including a vertex at one end thereof and a side surface coming to a point at said vertex, the vertices of said first, second, third and fourth prisms abutting the side surfaces of said second, third, fourth and first prisms, respectively.

* * * * *